United States Patent [19]
Greenberg

[11] 3,958,997
[45] May 25, 1976

[54] METHOD OF SHAKER MOLDING AND COMPOSITION THEREFOR

[76] Inventor: Allen A. Greenberg, 9149 Peachblossom Court, Cincinnati, Ohio 45231

[22] Filed: July 21, 1971

[21] Appl. No.: 164,740

[52] U.S. Cl. ............ 106/38.5 R; 106/38.5 D; 106/38.35; 106/209; 106/111; 106/114
[51] Int. Cl.² ............................................. C08L 5/04
[58] Field of Search ............... 106/38.5 R, 38.5 D, 106/38.35, 111, 114, 209

[56] References Cited
UNITED STATES PATENTS

| | | | |
|---|---|---|---|
| 2,769,717 | 11/1956 | Cresson | 106/38.5 D |
| 3,268,348 | 8/1966 | Morrell | 106/38.5 D |
| 3,282,710 | 11/1966 | Morrell | 106/38.5 D |
| 3,371,135 | 2/1968 | Goodwin | 264/71 |

*Primary Examiner*—Lorenzo B. Hayes
*Attorney, Agent, or Firm*—James W. Pearce; Roy F. Schaeperklaus

[57] ABSTRACT

A mixture of water and a molding powder are shaken together in an assembly to form a smooth mixture. The molding powder includes an alkali metal alginate, calcium sulfate, tetrasodium pyrophosphate, and a filler. The mixture sets to form a jelly-like object which dries to form a rigid object of smaller size which is a substantially exact miniature of the jelly-like object.

8 Claims, 10 Drawing Figures

U.S. Patent May 25, 1976 Sheet 1 of 3 3,958,997
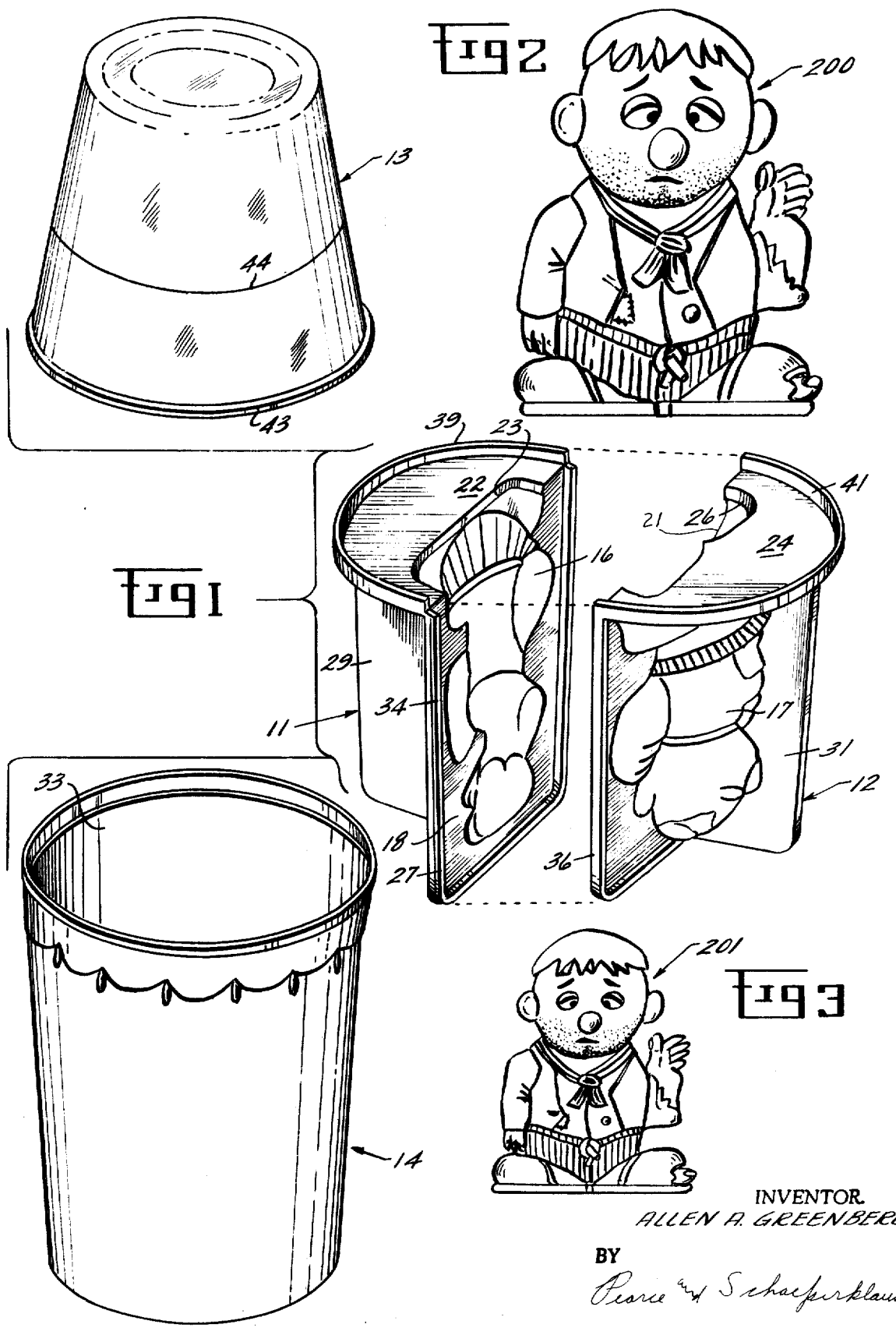
INVENTOR.
ALLEN A. GREENBERG
BY
Pearce and Schaefurklaus
ATTORNEYS-

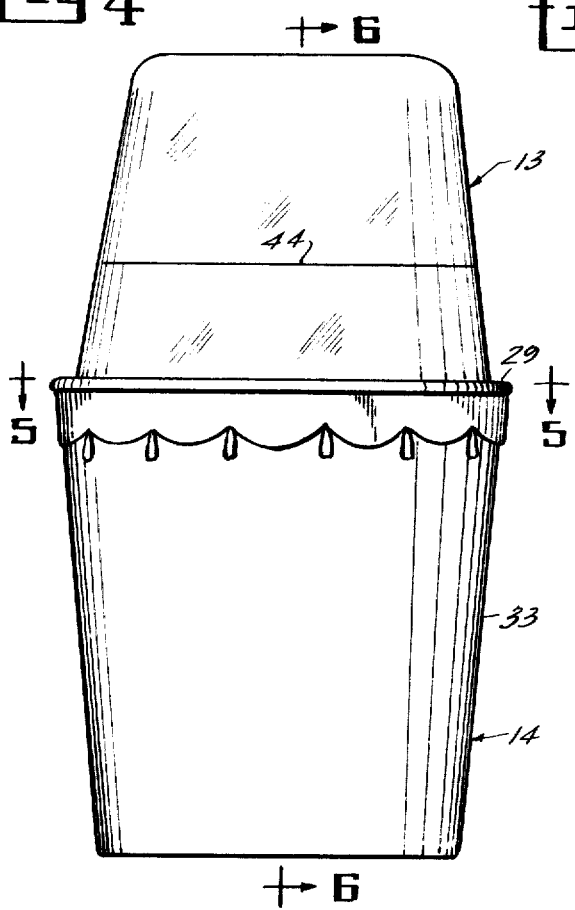
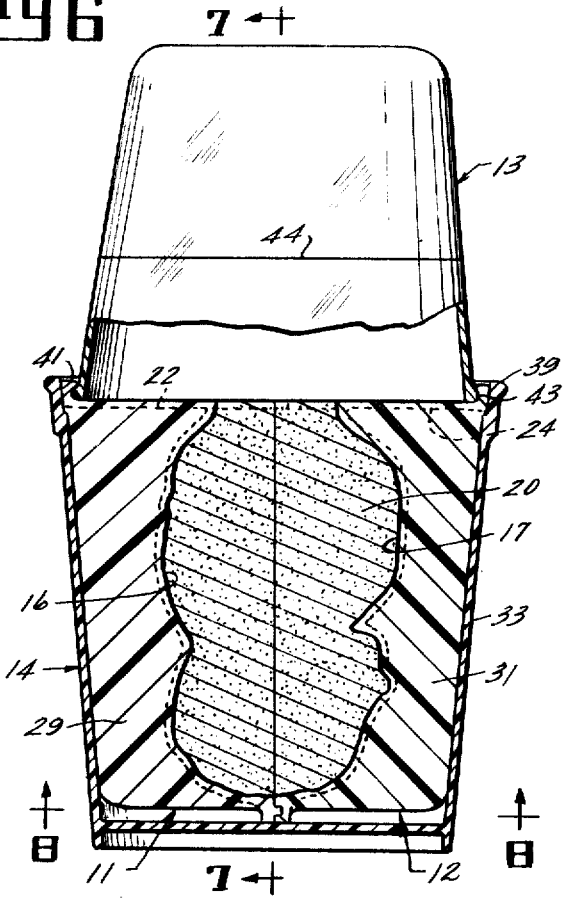
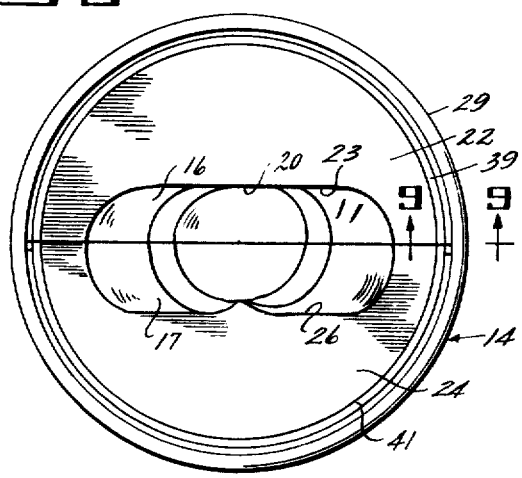
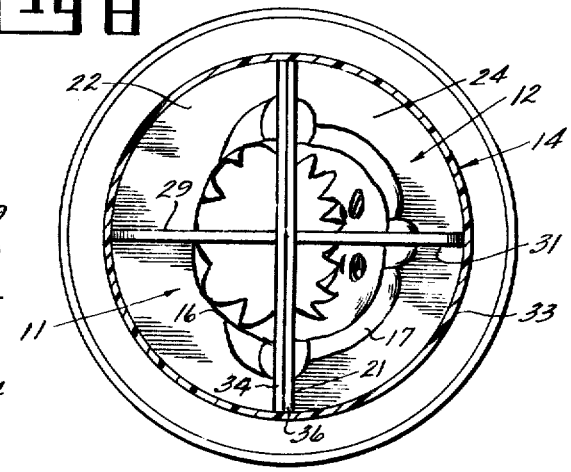

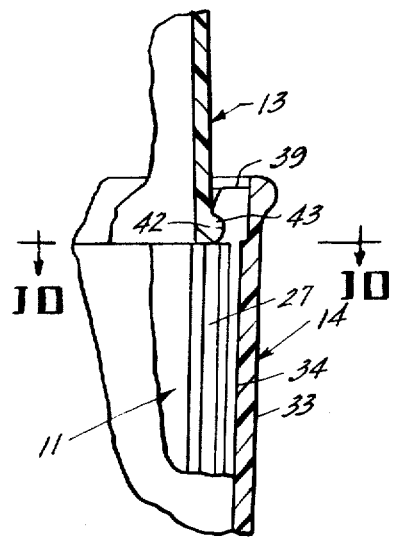
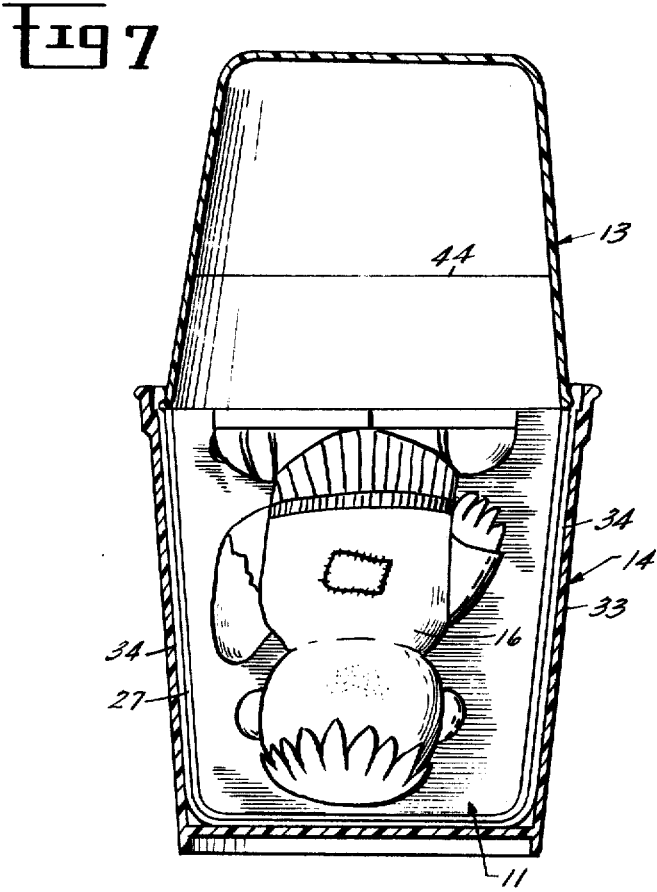
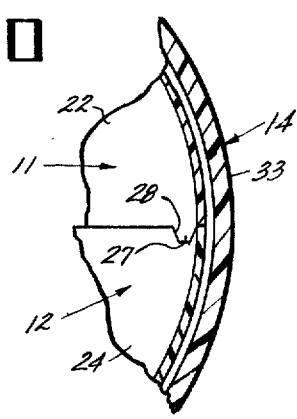

METHOD OF SHAKER MOLDING AND COMPOSITION THEREFOR

This invention relates to molding apparatus and to a method of molding.

An object of this invention is to provide a molding apparatus which includes a shaker-mixer device in which ingredients to be molded are shaken to be mixed before setting in the mold.

A further object of this invention is to provide a method of forming a molded object in which water and a molding powder mixture are shaken together in a shaker-mixer-mold device to cause intimate mixing of the water and the molding powder mixture and in which the mixed water and molding powder mixture passes directly to a mold cavity in which the object is molded.

A further object of this invention is to provide such a method in which a molded object of a jelly-like consistency is formed in the mold cavity which object shrinks while maintaining its molded shape to a stiff object of substantially smaller size than the molded object but of almost exactly the same shape.

Briefly, this invention provides a shaker-mixer-mold assembly which includes a measuring cup member, mold sections which can be held in engagement with the edge of the measuring cup member with a mold cavity of the mold sections in communication with the interior of the measuring cup member, and a mold holding cup-shaped holder member inside which the mold sections are received to be held in assembled relation therein as contents thereof are shaken. Water and a molding powder mixture can be placed in the measuring cup member, the mold sections and the holder member are assembled therewith, and the water and powder are shaken together inside this assembly to provide a uniform mixture. Then the assembly is set with the measuring cup member up, and the contents flow into the mold cavity to set thereinside. The molding powder mixture can consist essentially of potassium alignate and diatomaceous earth, there being sufficient potassium alginate to bind the diatomaceous earth and water into a jelly-like molded mass. When the object is removed from the mold, it dries and shrinks, but, as the object shrinks it retains its shape to form a rigid dried object which is a miniature of the original molded mass having the shape of the mold cavity. The miniature retains almost perfectly the proportions of the original.

The above and other objects and features of the invention will be apparent to those skilled in the art to which this invention pertains from the following detailed description and the drawings, in which:

FIG. 1 is an exploded perspective view showing a molding device constructed in accordance with an embodiment of this invention;

FIG. 2 is a view in front elevation of an object molded in the molding device of FIG. 1 as the object emerges from mold members thereof;

FIG. 3 is a view in front elevation of the object molded in the molding device of FIG. 1 after it has dried and shrunk to final form;

FIG. 4 is a view in front elevation of the molding device shown in FIG. 1 with sections thereof in assembled relation;

FIG. 5 is a plan view looking in the direction of the arrows 5—5 in FIG. 4;

FIG. 6 is a view in section taken on the line 6—6 in FIG. 4;

FIG. 7 is a view in section taken on the line 7—7 in FIG. 6;

FIG. 8 is a view in section taken on the line 8—8 in FIG. 6;

FIG. 9 is an enlarged view in section taken on the line 9—9 in FIG. 5; and

FIG. 10 is a view in section taken on the line 10—10 in FIG. 9.

In the following detailed description and the drawings, like reference characters indicate like parts.

In FIG. 1 is shown a shaker-molding device constructed in accordance with an embodiment of this invention which includes relatively thin mold halves 11 and 12, a measuring cup 13 and a mold holder 14. The mold halves 11 and 12 include opposed concave portions 16 and 17, respectively, which cooperate to form a mold cavity 20 (FIG. 6) for forming an object 200, which can be of the form shown in FIG. 2. A flat face portion 18 of the mold half 11 (FIG. 1) outboard of the mold cavity 16 engages a flat face portion 21 of the mold half 12 outboard of the mold cavity 17. The flat faces 18 and 21 surround three sides of each of the mold cavities 16 and 17, respectively, with a fourth side of each mold cavity being open. A face 22 of the mold half 11 defines an open side 23 of the mold cavity 16. A face 24 of the mold half 12 defines a corresponding open side 26 of the mold cavity 17. A tongue 27 which extends in a U-shape around an outer edge of the flat face 18 of the mold half 11 is received in a complementary groove 28 (FIG. 10) in the mold half 12 to locate mold halves during assembly. Wedge shaped ribs 29 and 31 are formed on the mold halves 11 and 12, respectively. The rib 29 extends in a plane perpendicular to the plane of the flat face 18 and of the face 22 of the mold half 11. The rib 31 extends in a plane perpendicular to the planes of the flat face 21 and of the face 29 of the mold half 12. The mold halves can be made of firm but relatively flexible material such as polyethylene or the like.

The mold holder 14 includes a wall 33 which defines a cavity of frusto-conic shape. The wall 33 is complementary to and cooperates with the wedge shaped ribs 29 and 31 and side edges of faces 18 and 21 of the mold halves 11 and 12, respectively, when the mold halves are disposed inside the mold holder, as shown in FIGS. 6 and 7, so that when the mold halves are pushed into the mold holder, interaction between the ribs 29 and 31 of the mold holder 14 urges the mold halves together with the flat face 18 of the mold half 11 firmly engaging the flat face 21 of the mold half 12. Upright outer edges 34 of the flat face 18 of the mold half 11 and upright outer edges 36 of the mold half 12 also are complementary to the wall 33 of the mold holder 14 and serve to position the mold halves properly inside the mold holder. The mold holder can be formed of appropriate relatively rigid plastic material such as polystyrene.

Outer edges of the faces 22 and 24 of the mold halves 11 and 12 are circular and are provided with upstanding ribs 39 and 41, respectively. Details of construction of the rib 39 are shown in FIG. 9, the rib 41 being of similar construction. The rib 39 is provided with an inwardly opening slot 42 which receives a flange 43 at the mouth of the measuring cup 13 to lock and seal the edge of the measuring cup to the mold halves. The ribs 39 and 41 cooperate to form an annular upstanding rib when the mold halves are assembled.

The measuring cup 13 can be formed of transparent material such as transparent plastic material or glass and is provided with an indicator line 44 indicating a line to which the measuring cup is to be filled with water in performing a molding operation. The volume of the liquid contained in the measuring cup 13 when filled to the indicator line 44 can be the volume which, when mixed with a predetermined amount of molding powder, will fill the mold cavity 20.

When a molding operation is to be instituted, the measuring cup 13 is set in upright position (inverted from the FIG. 1 position) and water is added to the measuring cup until the water is at the level of the line 44. To the water is added a predetermined amount or batch of a molding powder which preferably consists of the following:

10 percent potassium alginate
12 percent $CaSO_4.2H_2O$
¾ percent anhydrous tetrasodium pyrophosphate
74 ¼ percent coarse ground diatomaceous earth
1 percent pigment, all percentages being by weight, all constituents being ground to form a powder. The weight of the batch of molding powder can be approximately one-sixth of the weight of the water.

When the batch of molding powder has been added to the water in the measuring cup 13, the mold halves 11 and 12 are assembled on the flange 43 of the measuring cup, and the mold holder 14 is mounted thereover. The tongue and groove portions 27, 28 serve to locate the mold halves. The mold holder 14 and the measuring cup 13 can then be grasped and pushed toward each other to force the mold halves together. The mold halves 11 and 12 and the measuring cup 13 lock together, and the liquid and the molding powder are contained within the mold halves and the measuring cup. Urging of the measuring cup toward the mold halves causes a tight seal between the edge of the measuring cup and the mold halves. The contents of the assembly can be shaken for approximately 20 seconds to cause thorough mixing of the molding powder and the water. Then the assembly is set in the position shown in FIG. 6 and the contents flow into the mold cavity 20 and set or gel therein. After approximately 5 minutes, the assembly is taken apart. The measuring cup 13 is removed, the mold holder is inverted, and the edge of the mold holder is tapped on a table or the like (not shown) to cause the mold halves to be released from the mold holder. The mold halves are then withdrawn in directions normal to the flat face portions 18 and 21 to release the molded object 200 (FIG. 2). As removed from the mold halves, the object 200 is a jelly-like consistency. As the object dries, it shrinks but retains its shape and appearance and eventually, after a period of a few days of drying at room temperature, becomes a dried object having a volume of approximately one-fourth the original volume, as indicated in FIG. 3 at 201. The dry object is rigid and dry to the touch unlike the original jelly-like object as removed from the mold halves.

The molding powder formulation given above is the preferred formulation. However, another alkali metal alginate such as sodium alignate can be used instead of potassium alginate. The percentage of alkali metal alignate can vary from about 7 to about 15 percent of the molding compound with the percentage of $CaSO_4.2H_2O$ being 1.2 times the percentage of alkali metal alginate. Diatomaceous earth is the preferred filler for the molding powder composition but other inert fillers can be used in place of the diatomaceous earth such as silica, magnesium carbonate, and kaolin (china clay).

The percentage of the tetrasodium pyrophosphate can also be varied from ¾ percent to approximately 3 percent, but with more than 3 percent tetrasodium pyrophosphate, the setting or gelling time may be one-half hour or more, and larger percentages of tetrasodium pyrophosphate would result in excessive setting or gelling times longer than one-half hour.

The molding assembly and the method of forming a molded article described above and illustrated in the drawings is subject to modification without departing from the spirit and scope of the appended claims.

Having described my invention, what I claim and desire to secure by letters patent is:

1. A method of forming a molded object which comprises mixing together approximately 6 parts of water and one part of a molding powder consisting essentially of from 7 to 15 percent alkali metal alginate, an amount of calcium sulfate equal to 1.2 times the amount of alkali metal alginate, and ¾ to 3 percent tetrasodium pyrophosphate, the remainder being a filler selected from the group consisting of diatomaceous earth, silica, magnesium carbonate, and kaolin, all parts and percentages being by weight, allowing the mixture to set and gel in a mold to form a jelly-like object, and drying the jelly-like object outside the mold to form a smaller rigid molded object.

2. A method as in claim 1 wherein the alkali metal alginate is approximately 10 percent of the molding powder.

3. A method of forming a molded object which comprises mixing together approximately 6 parts of water and one part of a molding powder consisting essentially of from 7 to 15 percent alkali metal alginate, an amount of calcium sulfate equal to 1.2 times the amount of alkali metal alginate, and ¾ to 3 percent tetrasodium pyrophosphate, the remainder being an inert filler, all parts and percentages being by weight, allowing the mixture to set and gel in a mold to form a jelly-like object, and drying the jelly-like object outside the mold to form a smaller rigid molded object.

4. A method as in claim 3 wherein the filler is diatomaceous earth.

5. A molding powder consisting essentially of 7 to 15 percent alkali metal alginate, an amount of calcium sulfate equal to 1.2 times the amount of alkali metal alginate, and ¾ to 3 percent tetrasodium pyrophosphate, the remainder being a filler selected from the group consisting of diatomaceous earth, silica, magnesium carbonate, and kaolin, all percentages being by weight.

6. A molding powder consisting essentially of 7 to 15 percent alakli metal alginate, an amount of calcium sulfate equal to 1.2 times the amount of alkali metal alginate, and ¾ to 3 percent tetrasodium pyrophosphate, the remainder being an inert filler, all percentages being by weight.

7. A molding powder as in claim 5 wherein the percentage of alkali metal alginate is approximately 10 percent.

8. A molding powder as in claim 7 wherein the percentage of tetrasodium pyrophosphate is approximately ¾ percent.

* * * * *